(No Model.) 2 Sheets—Sheet 1.

N. ISACHSON.
HAY FORK.

No. 464,363. Patented Dec. 1, 1891.

Attest
Walter Donaldson
F. L. Middleton

Inventor
Norman Isachson
by Elis Spear
Atty.

(No Model.) 2 Sheets—Sheet 2.

N. ISACHSON.
HAY FORK.

No. 464,363. Patented Dec. 1, 1891.

Attest
Walter Maddox,
F. L. Middleton.

Inventor
Norman Isachson
by Ellis Spear
Atty.

UNITED STATES PATENT OFFICE.

NORMAN ISACHSON, OF MARION, IDAHO.

HAY-FORK.

SPECIFICATION forming part of Letters Patent No. 464,363, dated December 1, 1891.

Application filed September 23, 1891. Serial No. 406,580. (No model.)

*To all whom it may concern:*

Be it known that I, NORMAN ISACHSON, a citizen of the United States of America, residing at Marion, in the county of Cassia and State of Idaho, have invented certain new and useful Improvements in Hay-Forks, of which the following is a specification.

My invention is an improvement in hay-forks having outwardly-flaring tines adapted to be inserted into the hay and a suitable trip mechanism carried upon the standard for releasing the tines and allowing their points to swing in proximity to each other to release the load.

The object of the invention is to provide a fork having removable tines, whereby any number of teeth may be used, according to the requirements of the work in hand, or the tines only partially inserted in the hay when any obstruction is encountered such as the sides of the hay-wagon, said tines being readily replaced in case of breakage and easily operated to engage the load of hay and to release the same.

Figure 1:
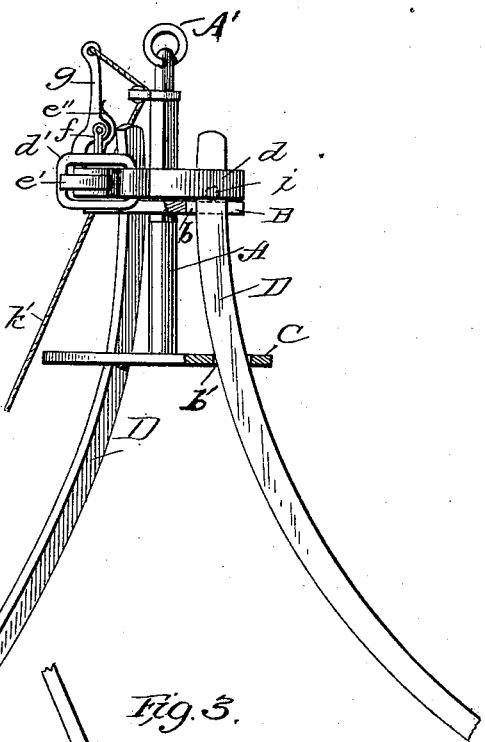
Figure 3:
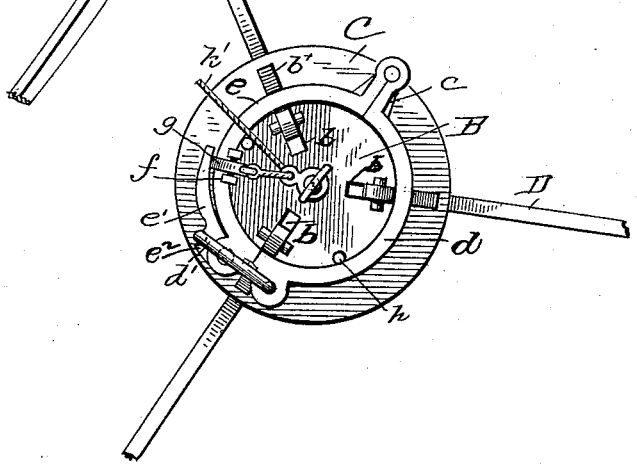
Figure 2:
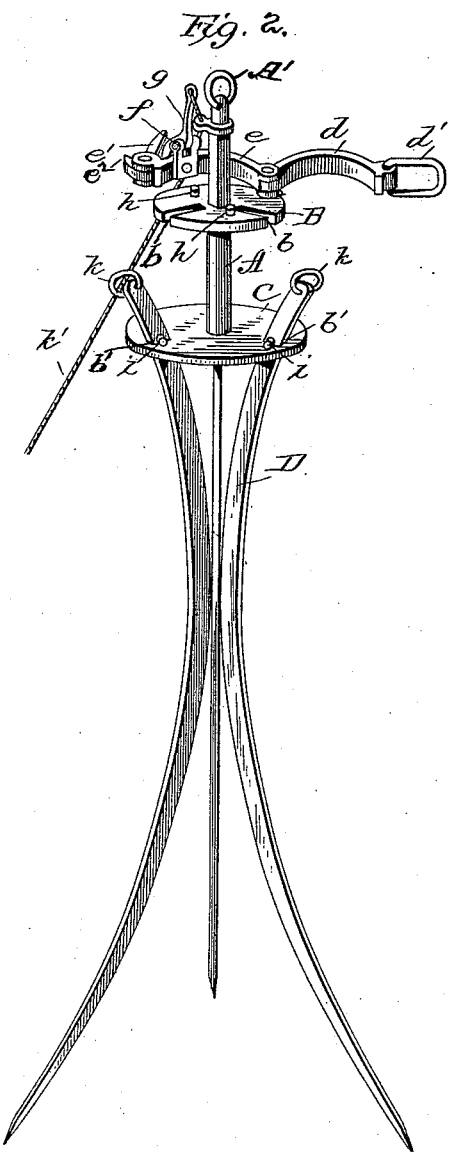

In the accompanying drawings, which illustrate my invention, Figure 1 is an elevation of the fork, showing the standard in readiness to be placed upon the load of hay. Fig. 2 is a view of the fork after the trip has been operated and the hay carried upon the fork released. Fig. 3 is a plan view of the tines-releasing mechanism.

In the drawings the standard is shown as consisting of the vertical rod A, carrying at its middle and lower portions, respectively, the circular plates B and C, and provided at its upper end with a ring A' for the hoisting-rope. The lower plate C has a series of slots or openings $b'$, preferably six in number, near its circumference, through which the tines are to be inserted, and the upper plate B has recesses $b$, extending from the periphery toward the rod A, and corresponding in number and position to the openings in the plate C. The plate B has an extension $c$, Fig. 3, upon one side, and to this extension are pivoted two semicircular arms $d$ $e$, which, when their ends are in contact, form a ring or flange upon the outer edge of said upper plate. The free ends of these arms are provided with fastening devices, the arm $d$ having a link $d'$ and the arm $e$ having a pivoted lever $e'$, with a lug $e^2$, which engages the link and holds the ends together.

Upon an extension $f$ on the upper side of the arm $e$ is pivoted a small vertical arm or lever $g$, the lower end of which, when the arms $d$ and $e$ are locked, rests behind the lever $e'$ to throw the same outward and release the link from engagement with the lug. A cord $k'$ is attached to the upper end of the lever $g$, this cord passing through a ring or pulley on the rod A and thence to the hand of the operator. Small lugs may be provided upon the upper surface of plate B, as at $h$ $h$, against which the arms $d$ $e$ bear, thus determining their position. The tines of the fork are shown at D, of curved form and of any desired length and size. They are provided near their upper ends with lugs or enlargements $i$ to bear against the plate B and stop the tines in their downward movement, and have suitable handles $k$ to aid in their insertion in the hay. After the standard has been placed upon the hay and the semicircular arms locked together the tines are inserted one at a time through the slots and openings $b$ and $b'$ in the plates B and C and driven down into the hay, their points diverging as they are driven in, owing to the curved form of the tines. The tines may be driven into the hay as far as the lugs upon their upper ends will permit; but in case the point of any tine comes in contact with an obstruction such as the side of the rack or wagon carrying the hay it may be left partially inserted and will operate just as effectively. Any number of tines may be used, according to the character of the hay or grain to be lifted, either two, three, four, or six, and by this means such weight may be dispensed with when from the nature of the hay only a few tines are required. Owing to the removable character of the tines, they may be readily replaced in case of breakage without taking the fork apart or causing any delay. After the fork has been raised from the hay, carrying with it the portion engaged by the diverging tines, and has reached the position where it is desired that it shall drop its load, the cord $k'$ is pulled by the operator, thus throwing out the end of lever $e'$ through the vertical arm $g$ and releasing the link from its engaging lug and allowing the arms to fly apart and the upper ends of the tines to escape from the slots or recesses in the plate B. The points of the tines thus come in proximity to each other, making the tines approximately parallel and allowing the load carried by the fork to slide therefrom and be deposited in the desired place. To keep the lower end of the arm $g$ constantly behind the lever $e'$, a spring $e''$ may be provided, or the lower end of the arm may be weighted and thus kept in position by gravity when the cord is loose.

Having thus described my invention, what I claim is—

1. In a hay-fork, the standard, the upper and lower plates having slots or openings at the periphery thereof, tines adapted to be inserted in the slots, arms for holding the tines therein, and means for releasing the arms to allow the tines to be freed to drop their load, substantially as described.

2. In combination, the vertical rod, the lower and upper plates having openings and recesses, respectively, curved tines adapted to be inserted in said openings and recesses, arms pivoted to the upper plate for holding the tines in the recesses, a catch for holding said arms together, and means for operating said catch, substantially as described.

3. In combination, the standard, the lower plate having openings near the edge, the upper plate having recesses therein, said upper plate having an extension upon one edge, curved arms pivoted to the extension, and curved tines adapted to be inserted in the openings and recesses in the plates and retained by the arms, substantially as described.

4. In combination, the standard, the lower plate having openings therein, the upper plate having recesses, tines adapted to be inserted through said openings and recesses, arms pivoted to the upper plate to engage the upper ends of the tines, a catch for holding the arms together, consisting of a link upon one arm and a lever upon the other, having a lug for engaging the link, and an arm pivoted upon the tine-retaining arm, adapted to operate the lever to release the catch, substantially as described.

In testimony whereof I affix my signature in presence of two witnesses.

NORMAN ISACHSON.

Witnesses:
JOHN F. HANSEN,
LAFAYETTE ROSE.